UNITED STATES PATENT OFFICE.

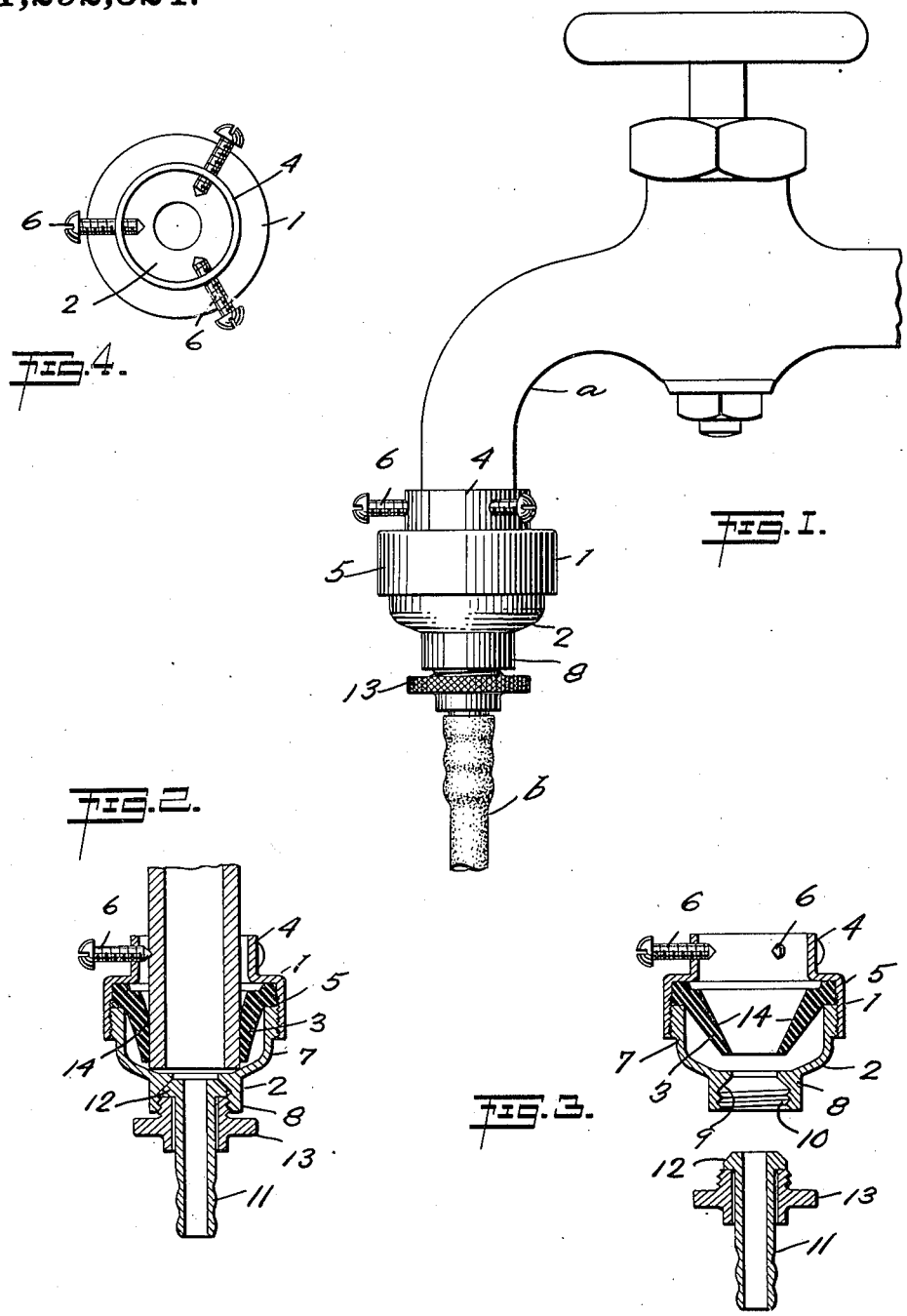

LEMUEL W. SERRELL, OF PLAINFIELD, NEW JERSEY.

DEVICE FOR CONNECTING HOSE TO FAUCETS.

1,292,524.

Specification of Letters Patent. Patented Jan. 28, 1919.

Application filed May 29, 1915, Serial No. 31,102. Renewed March 28, 1918. Serial No. 225,350.

*To all whom it may concern:*

Be it known that I, LEMUEL W. SERRELL, a citizen of the United States, and a resident of Plainfield, in the county of Union and State of New Jersey, have invented certain new and useful Improvements in Devices for Connecting Hose to Faucets, of which the following is a specification.

The invention is a device for connecting rubber tubing or hose with faucets, and the objects are to secure a simple and inexpensive construction, to provide a device the body of which can be applied to the faucet in a semi-permanent manner and by persons without mechanical skill, to permit ready and secure connection of the hose with and disconnection of the same from the body of the device, which remains at all times upon the faucet, to prevent all possibility of the device being forced off the faucet by the water pressure, and to guard against leakage. These ends are attained by the construction, the preferred embodiment of which will now be briefly described.

In the drawings:

Figure 1 is a side elevation of the device and tubing applied to a faucet;

Fig. 2 is a longitudinal section thereof;

Fig. 3 is a longitudinal section through the device, showing the nipple separate from the body; and Fig. 4 is a top plan view.

The body of the device comprises two members 1 and 2, constituting a shell containing a washer 3.

The part 1 is adapted to be affixed to the faucet *a*, and is formed with a collar 4 and a coupling portion 5 of larger diameter than the collar. The internal diameter of the collar is such as to slip loosely over the average faucet nozzle, or the largest sizes ordinarily encountered, and is positively fixed thereto, without requiring a special formation of the faucet, by means of radial, pointed screws 6, which pass through threaded openings in the collar so as to be forced into the metal of the faucet nozzle.

The coupling portion 5 is internally threaded to receive the lower member 2 of the shell. The said member comprises an upper portion 7 of relatively large diameter, which is externally threaded to engage the internal threads of the portion 5 of the member 1, and a reduced portion 8, which is formed with an internal ground seat 9 and screw-threads 10.

The remainder of the device comprises a corrugated nipple 11, adapted to receive the end of the flexible hose *b* and having a head 12 formed with a seating surface, which may be forced against the seat 9 by a hollow nut 13 engaging the threads 10 and bearing against the shoulder formed by the head.

The elastic washer 3 is clamped at its upper end between the portions 1 and 2 of the body or shell, and has downwardly converging walls 14 to clasp the faucet nozzle. The lower end of the washer is free and is materially smaller than the nozzle of the faucet, so that it must be stretched in order to pass over the latter. Preferably the washer is of substantially hollow truncated conical form, as shown, with its walls tapering in thickness toward the lower end. It will be observed that the device is so constituted that in use the pressure of the water which enters the shell presses the washer against the faucet, thereby assisting the elasticity of the material in preserving a leak-tight joint.

The body of the device when affixed to the faucet by the screws 6 is designed to be left in place, its construction and appearance being such that it is not objectionable as a part of the faucet. The nipple 11 is intended to be left in the end of the hose, between which and the head 12 the nut 13 is confined against loss. The hose is therefore attached and detached simply by screwing and unscrewing the nut.

What I claim as new is:

1. Device for connecting hose to faucets of varying sizes, comprising a sectional shell having radial screws for permanently securing it to a faucet, and an elastic washer having a peripheral portion clamped between the sections of the shell and a downwardly and inwardly tapering neck to receive and clasp the faucet, the lower portion of said shell being adapted for the reception of a quick detachable nipple carrying the hose.

2. Device for connecting hose to faucets of varying sizes, comprising a sectional shell having radial screws for permanently securing it to a faucet, an elastic washer having a peripheral portion clamped between the sections of the shell and a downwardly and inwardly tapering neck to receive and clasp the faucet, a nipple to receive the hose, and a screw collar for detachably coupling the nipple and shell.

LEMUEL W. SERRELL.